United States Patent
Fukumoto

[19]

[11] Patent Number: 5,933,204
[45] Date of Patent: *Aug. 3, 1999

[54] DISPLAY DEVICE AND PRODUCTION METHOD THEREOF WITH INSULATING MEMBERS BETWEEN PIXEL ELECTRODES FOR SMOOTH SURFACE

[75] Inventor: Yoshihiko Fukumoto, Atsugi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/671,373

[22] Filed: Jun. 27, 1996

[30] Foreign Application Priority Data

Jun. 30, 1995  [JP]  Japan .................................. 7-186473
Jun. 20, 1996  [JP]  Japan .................................. 8-178711

[51] Int. Cl.[6] .......................... G02F 1/136; G02F 1/1333; G02F 1/1343; G02F 1/13
[52] U.S. Cl. ........................... 349/43; 349/122; 349/139; 349/187
[58] Field of Search ................. 349/43, 46, 122, 349/139, 187

[56] References Cited

U.S. PATENT DOCUMENTS

| | | | |
|---|---|---|---|
| 4,024,626 | 5/1977 | Leupp et al. ............................... | 29/571 |
| 5,209,816 | 5/1993 | Yu et al. .................................. | 156/636 |
| 5,244,534 | 9/1993 | Yu et al. .................................. | 156/636 |
| 5,394,000 | 2/1995 | Ellul et al. ............................... | 257/301 |
| 5,494,857 | 2/1996 | Cooperman et al. ................... | 437/228 |
| 5,537,234 | 7/1996 | Williams et al. ......................... | 349/42 |
| 5,592,318 | 1/1997 | Majima et al. ......................... | 349/122 |
| 5,597,223 | 1/1997 | Watanabe et al. ........................ | 349/61 |

FOREIGN PATENT DOCUMENTS

| | | |
|---|---|---|
| 0556822 | 8/1993 | European Pat. Off. . |
| 4-115226 | 4/1992 | Japan . |
| 5-303096 | 11/1993 | Japan . |
| 2279797 | 1/1995 | United Kingdom . |

*Primary Examiner*—William L. Sikes
*Assistant Examiner*—Toan Ton
*Attorney, Agent, or Firm*—Fitzpatrick, Cella, Harper & Scinto

[57] ABSTRACT

Disclosed herein is a method of producing a display device comprising a substrate and a plurality of conductive members provided on the substrate, said conductive members each having a substantially even surface and making up pixels, wherein the conductive members are smoothed by means of chemical mechanical polishing.

125 Claims, 11 Drawing Sheets

DISPLAY DEVICE AND PRODUCTION METHOD THEREOF WITH INSULATING MEMBERS BETWEEN PIXEL ELECTRODES FOR SMOOTH SURFACE

BACKGROUND OF THE INVENTION

1. Field of the Invention

The present invention relates to a display device of video images or picture images typified by a liquid crystal display device, and a production method thereof.

2. Related Background Art

FIGS. 11A to 11E illustrate production processes of an active matrix substrate used in an active matrix type liquid crystal display device as an example of a conventional display device. The production processes are described by reference to the drawings. First of all, an n-type silicon semiconductor substrate 1 is partially thermally oxidized to form LOCOS (local oxidation of silicon) oxide films 2. The LOCOS oxide films 2 are used as a mask to ion-implant impurities, thereby forming PWLs 3. This substrate 1 is thermally oxidized again to form gate oxide films 4 (FIG. 11A).

After gate electrodes 5 composed of an n-type polysilicon doped with impurities are then formed, impurities are ion-implanted in the whole surface of the substrate 1 to form NLDs 6 which are n-type impurity regions. Impurities are subsequently ion-implanted using a patterned photoresist as a mask to form source and drain regions 7 and 7' (FIG. 11B).

A-PSG (phospho-silicate glass; phosphate glass) layer 8, which is an interlayer film, is formed on the whole surface of the substrate 1. After contact holes are patterned at portions of the PSG layer 8, which are situated right over the source and drain regions 7 and 7', and an Al film is formed on the PSG layer 8 by sputtering, the Al film is patterned to form Al electrodes 9 (FIG. 11C).

A PSG layer 11, which is an interlayer film, is formed in a thickness of about 10,000 Å on the whole surface of the substrate 1, and through-holes are patterned (FIG. 11D).

A film of a metallic material such as Al, Ti, Ta or W, or a compound thereof is formed in a thickness of about 5,000 Å on the surface of the PSG layer 11 on the substrate 1 by sputtering or the like, thereby forming pixel electrodes 12 by patterning (FIG. 11E).

Besides the active matrix substrate using such a silicon substrate, an example of an active matrix substrate using an insulating substrate is illustrated in FIG. 12.

FIG. 12 is a cross-sectional view of an active matrix substrate for a liquid crystal display device described in U.S. Pat. No. 4,024,626. In the drawing, reference numerals 120, 131, 132, 133, 135 and 136 indicate an insulating substrate, a gate electrode, a potential-fixing electrode, a pixel capacitance electrode, an interlayer film and a pixel electrode, respectively.

In the display device illustrated in FIGS. 11A to 11E, the surface of a pixel electrode 13 is influenced by difference in level of the underlying layer, and hence becomes uneven as illustrated in FIG. 11E. Besides, as apparent from FIG. 11E, this substrate requires cutting a groove having the same depth as the film thickness of the pixel electrode 13 between the individual pixel electrodes so as to insulate them from each other.

When light strikes on this pixel electrode 13, the incident light is scattered all around due to the irregularities of its surface, and so the reflection efficiency of light becomes very low. Besides, the surface irregularities form the cause of a failure in orientation in an orientation film-rubbing step of a packaging process of a liquid crystal. As a result, a failure to orientate the liquid crystal is caused, and the quality of images displayed is deteriorated due to the lowering of contrast.

Besides, since the portions corresponding to the grooves between the individual pixel electrodes are not rubbed, the cause of a failure in the orientation of the liquid crystal is formed, and at the same time, a lateral electric field is generated between the pixel electrodes conjointly with the surface irregularities, which electric field causes bright lines. The contrast of images displayed is markedly deteriorated by the occurrence of the bright lines, resulting in the reduction of image quality.

Even in the active matrix substrate illustrated in FIG. 12, the pixel electrodes 136 are insulated from each other. Therefore, grooves are cut in the same manner as illustrated in FIG. 11E, and the substrates is hence concerned about the fact that the same disadvantages as described above are brought about.

SUMMARY OF THE INVENTION

It is an object of the present invention to provide a display device by which the problems to be solved as described above are solved, and a production method thereof.

Another object of the present invention is to provide a display device in which irregularities on the surfaces of pixel electrodes are smoothed to prevent irregular reflection caused by the irregularities, and also a failure in orientation caused by the irregularities in the case of a liquid crystal display device so that the display can be made with high image quality, and a production method thereof.

A further object of the present invention is to provide a reflection type display device in which the surfaces of pixel electrodes are even, and any difference in level is substantially not present between the pixel electrodes, thereby enhancing a reflection efficiency of light, and a production method thereof.

The display devices and production methods thereof according to the present invention, by which the above objects can be achieved, have the following constitution.

The present invention includes two aspects of the display device.

In a first aspect of the display device according to the present invention, there is provided a display device comprising a substrate and a plurality of conductive members provided on the substrate, the conductive members each having a substantially even surface and comprising pixels, wherein insulating members each having a substantially even surface are provided at ends of their corresponding conductive members in such a manner that the substantially even surface of the insulating member ranges with the substantially even surface of the conductive member.

In a second aspect of the display device according to the present invention, there is also provided a display device comprising an active matrix substrate, in which a switching transistor is provided for each pixel electrode, an electrode substrate opposite to the active matrix substrate and a liquid crystal held between these substrates, wherein all the surfaces of pixel electrodes are on the same level with each other, and at least a part of a side wall of each of the pixel electrodes comes into contact with an insulator.

The present invention also includes two aspects of a method of producing a display device.

In a first aspect of the method of producing a display device according to the present invention, there is provided a method of producing a display device comprising a substrate and a plurality of conductive members provided on the substrate, the conductive members each having a substantially even surface and comprising pixels, wherein the conductive members are smoothed by means of chemical mechanical polishing.

In a second aspect of the method of producing a display device according to the present invention, there is also provided a method of producing a display device comprising an active matrix substrate, in which a switching transistor is provided for each pixel electrode, an electrode substrate opposite to the active matrix substrate and a liquid crystal held between these substrates, wherein a forming process of the pixel electrodes includes a polishing step by chemical mechanical polishing.

According to the present invention having such constitution, the above-described objects can be achieved.

According to the present invention, the pixel electrodes are formed by surface polishing making good use of chemical mechanical polishing (hereinafter abbreviated as "CMP"). Therefore, the surfaces of the pixel electrodes are formed smoothly like a specular surface and at the same time, on the same level with each other. Further, an insulating layer is formed, and the layer of the pixel electrodes is then formed on the insulating layer, or an insulating layer is formed on a layer of the pixel electrodes, in which holes are cut, to perform the polishing step, whereby spaces between the pixel electrodes are favorably filled up with the insulating layer to completely smooth irregularities. Therefore, irregular reflection and a failure in orientation caused by the irregularities can be prevented to permit displaying images with high image quality.

DESCRIPTION OF THE PREFERRED EMBODIMENTS

Figure 1A:
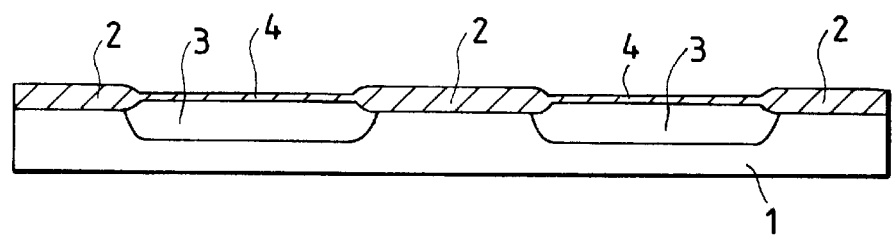
FIGS. 1A through 1E illustrate illustrative production processes of an active matrix substrate used in a display device according to an embodiment of the present invention.

The display devices and production processes thereof according to the present invention have the above-described constitution.

The greatest feature of the present invention is that the surfaces of conductive members, which make up pixel electrodes, are polished by means of CMP. By this polishing, the surface of each of the pixel electrodes becomes smooth like a specular surface, and all the surfaces of the pixel electrodes can be made the same level.

CMP is a method in which polishing is performed by making good use of a chemical etching action by a chemical component contained in an abrasive and a mechanical abrading action inherent in the abrasive. As an example of CMP, it is considered to form a reaction product by a chemical reaction of the chemical component contained in the abrasive with the surface of a sample to be polished and mechanically abrade and remove the reaction product with the abrasive and a polishing cloth. A process of CMP is as follows. After the sample to be polished is fitted to a rotatable abrading head, the surface of the sample to be polished is pressed against a rotating platen (turn table), thereby conducting polishing. A pad (polishing cloth) is stuck on the surface of the platen, and polishing is allowed to progress by a slurry (abrasive) attached to the pad.

Various kinds of apparatus are sold as apparatus for CMP. In the present invention, such apparatus may be suitably used. Examples of the apparatus for CMP include AVANTI 472 (trade name, manufactured by IPEC/PLANAR Co.), CMP-II (trade name, manufactured by Speed Fam Co.), EPO-113 and EPO-114 (trade names, manufactured by Ebara Corporation), MIRRA (trade name, manufactured by APPLIED MATERIALS Co.) and 6DS-Sp (trade name, manufactured by STRASBAUGH Co.).

As the slurry, there may be used MSW-1000, XJFW-8048H, XJFW-8097B and XJFW-8099 (trade names, products of Rodel Co.); SEMI-SPERSE W-A355 and SEMI-SPERSE FE-10 (trade names, products of Cabot Co.); PLANERLITE-5101, PLANERLITE-RD-93034, PLANERLITE 5102, PLANERLITE-RD-93035, PLANERLITE-5103 and PLANERLITE-RD-93036 (trade names, product of FUJIMI INCORPORATED); KLEBOSOL-20H12, KLEBOSOL-30H25, KLEBOSOL-30H50, KLEBOSOL-30N12, KLEBOSOL-30N25 and KLEBOSOL-30N50 (trade names, products of STI Co.); and the like.

As the polishing cloth, there may be used IC-1000, IC-1400, IC-60, IC-53, IC-50, IC-45, IC-40, Suba 400, Suba 400H, Suba 500, Suba 600, Suba 800, MHS15A, MHS24A, MHC14A, MHC14B, MHC15A, MHC26A, MHN15A, MHN24A, Supreme RN-H, Supreme RN-R, Whitex W-H, Whitex W-S, UR-100, XHGM-1158 and XHGM-1167 (trade names, products of Rodel Co.); Surfin XXX-5, Surfin 100, Surfin 260S, Surfin 000, Surfin 194, Surfin 191, Surfin 192, Surfin 2-X, Surfin 018-3, Surfin 018-0, Surfin 018, Surfin 200, Surfin 026, Surfin 024, Politex, Politex DG, Politex Suprem and Unicorfam (trade names, product of FUJIMI INCORPORATED); SBL135, SBD1014, 6ZP09, RP3010P5, GQ8785, GQ9810, GQ9806, GQ9813, GQ1070, GQ1110 and GQ1300 (trade names, products of Teijirn Limited); 1000, 1000R, 1200, 1200R, 1300, 1400, 2000, 2010, 2020, 4100, 4300, 4400, 4500, 4600, 4800, 4900, 5100 and 5400 (trade names, products of NAPCON Co.); and the like.

The present invention may be applied to display devices in which images are displayed by changing the angle of a mirror by applying voltage, in addition to liquid crystal display devices.

The present invention will hereinafter be described more specifically by the following Examples. However, the present invention is not limited to or by these examples.

EXAMPLE 1

Figure 1B:
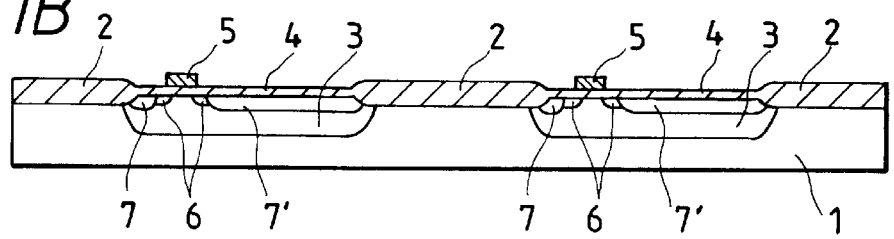
Figure 1C:
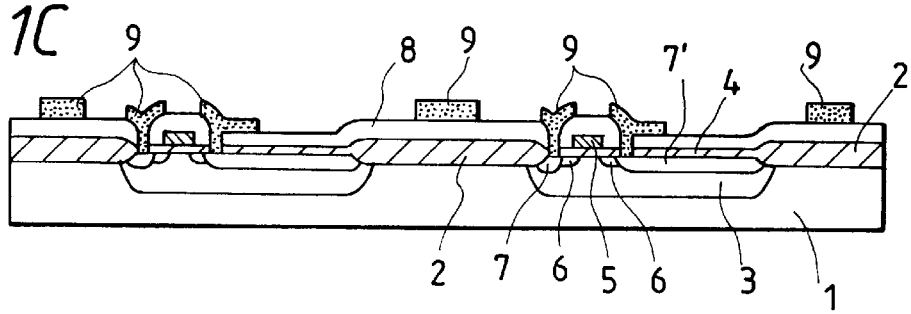

As an illustrative display device according to the present invention, a reflection type active matrix liquid crystal display device will be described. FIG. 2H is a typical view illustrating this liquid crystal display device. Referring now to FIG. 2H, PSG (phospho-silicate glass) members 11 are provided as insulating members at ends of conductive members 13 which make up pixel electrodes. The surfaces of the conductive members 13 and the insulating members 11 are polished by CMP. The production processes of this liquid crystal display device will hereinafter be described by reference to FIGS. 1A to 1E and FIGS. 2F to 2H. For convenience's sake of description, FIGS. 1A to 1E and FIGS. 2F to 2H typically illustrate the display device with a pixel part as the central figure. However, peripheral drive circuits such as a shift register for driving a switching transistor of the pixel part may also be formed on the same substrate at. the same time as the forming step of the pixel part.

First of all, an n-type silicon semiconductor substrate 1 having an impurity concentration of $10^{15}$ cm$^{-3}$ or lower is partially thermally oxidized to form LOCOS (local oxidation of silicon) oxide films 2. The LOCOS oxide films 2 are used as a mask to ion-implant boron in a. dose of about $10^{12}$ cm$^{-2}$, thereby forming PWLs 3 which are p-type impurity regions having an impurity concentration of about $10^{16-}$ cm$^{-3}$. This substrate 1 is thermally oxidized again to form gate oxide films 4 having an oxide film thickness of 1000 Å or smaller (FIG. 1A).

After gate electrodes 5 composed of an n-type polysilicon doped with phosphorus in a concentration of about $10^{20}$ cm$^{-3}$ are formed, phosphorus is ion-implanted in a dose of $10^{12}$ cm$^{-2}$ in the whole surface of the substrate 1 to form NLDs 6 which are n-type impurity regions having an impurity concentration of about $10^{16-}$ cm$^{-3}$. Phosphorus is subsequently ion-implanted in a dose of about $10^{15}$ cm$^{-2}$ using a patterned photoresist as a mask to form source and drain regions 7 and 7' having an impurity concentration of about $10^{19}$ cm$^{-3}$ (FIG. 1B).

A PSG layer 8, which is an interlayer film, is formed on the whole surface of the substrate 1. This PSG layer 8 may be replaced by an NSG (nondope silicate glass)/BPSG (boro-phospho-silicate glass) or TEOS (tetraethoxysilane) layer. After contact holes are patterned at portions of the PSG layer 8, which are situated right over the source and drain regions 7 and 7', and an Al film is formed on the PSG layer 8 by sputtering, the Al film is patterned to form Al electrodes 9 (FIG. 1C). In order to improve the ohmic contact characteristics of the Al electrode 9 with the source and drain regions 7 and 7', it is desirable that a barrier metal such as Ti/TiN be formed between the Al electrode 9 and the source and drain regions 7 and 7'.

Figure 1D:
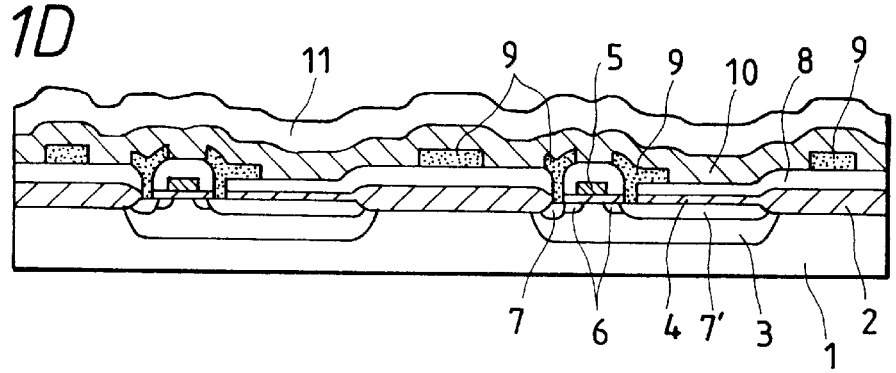

A plasma SiN film 10 is formed in a thickness of about 3,000 Å on the whole surface of the substrate 1, and a PSG layer 11 is then formed in a thickness of about 10,000 Å thereon (FIG. 1D).

Figure 1E:
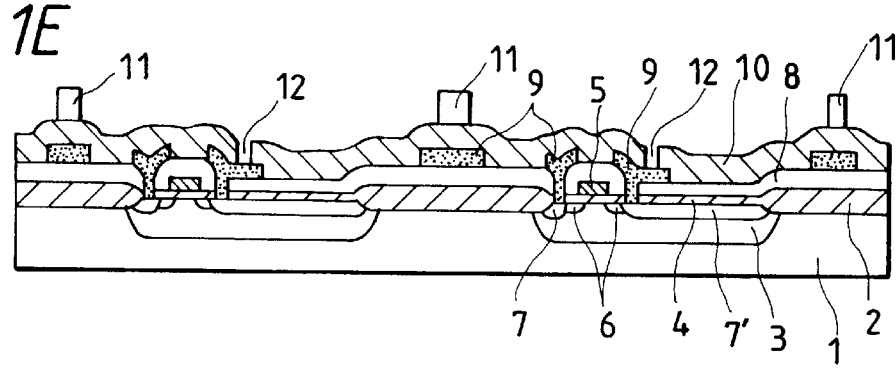

The PSG layer 11 is patterned using the plasma SiN film 10 as a stopper layer for dry etching so as to leave only areas by which pixels are separated from each other. Thereafter, through-holes 12 are patterned by dry etching right over the Al electrodes 9 in respect contact with the drain regions 7' (FIG. 1E).

Figure 2F:
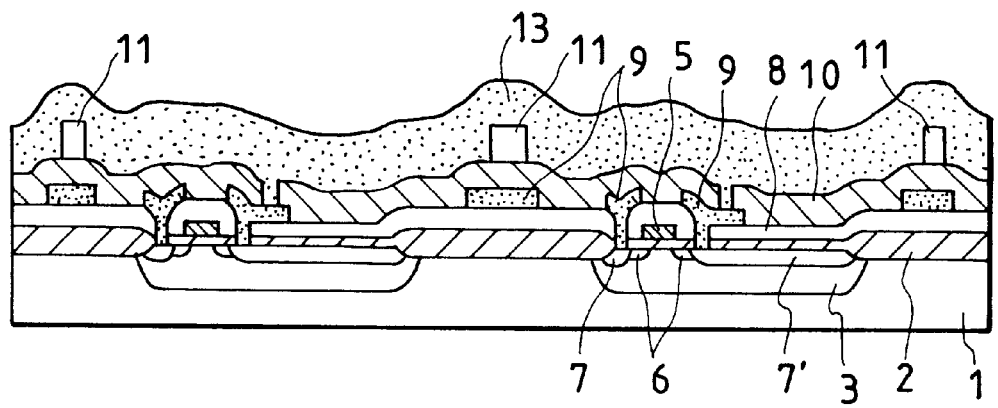
FIGS. 2F through 2H illustrate illustrative production processes of the active matrix substrate used in the display device according to the embodiment of the present invention.

A film for pixel electrodes 13 is formed in a thickness of 10,000 Å or greater on the substrate 1 by sputtering or EB (electron beam) deposition (FIG. 2F). As the film for the pixel electrodes 13, a film of a metal such as Al, Ti, Ta or W, or a film of a compound of such a. metal is used.

Figure 2G:
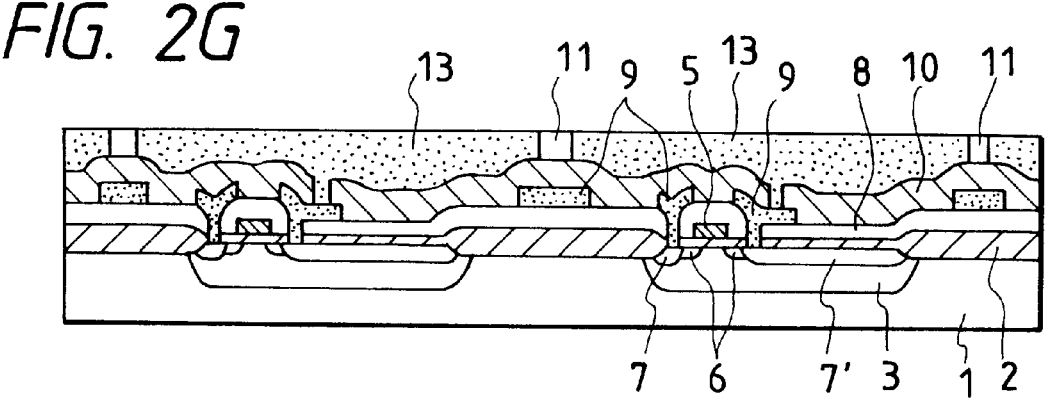
Figure 2H:
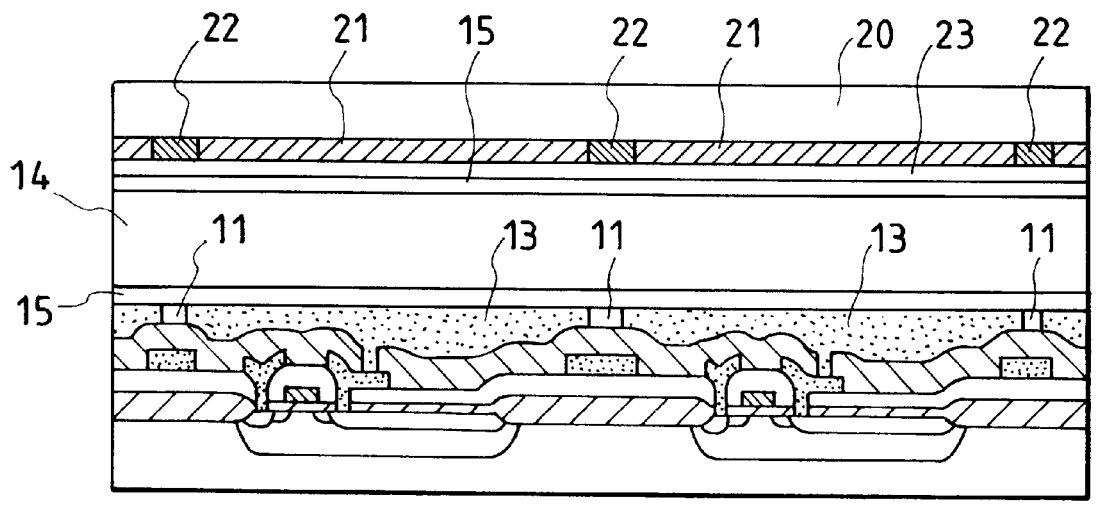

The surface of this film for the pixel electrodes 13 is polished by CMP (FIG. 2G). Supposing the thickness of the PSG layer 11 and the film thickness of the pixel electrode are 10,000 Å and x Å, respectively, a depth of abrasion is not less than x Å but less than x+10,000 Å.

More specifically, CMP is conducted by using EPO-114 (trade name) manufactured by Ebara Corporation as an apparatus for CMP, SUPREME RN-H (D51) (trade name) produced by Rodel Co. as a polishing cloth and PLANER-LITE 5102 (trade name) produced by FUJIMI INCORPORATED as a slurry.

An orientation film 15 is further formed on the surface of the active matrix substrate formed by the above, processes. The surface of the film is then subjected to an orientation treatment such as a rubbing treatment. After the thus-treated matrix substrate and an opposite substrate are stuck together through a spacer (not illustrated), a liquid crystal 14 is filled in a space between the substrates to provide a liquid crystal display device (FIG. 2H). In this embodiment, the opposite substrate is constructed by arranging color filters 21, black matrices 22, a common electrode 23 formed of ITO or the like and an orientation film 15' on a transparent substrate 20.

A driving method of the reflection type liquid crystal display device according to this embodiment will now be described.

A signal potential is applied to a source region 7 by a peripheral circuit such as a shift register formed on a chip basis on the substrate 1, and at the same time as this, a gate potential is applied to a gate electrode 5 to make a switching transistor of a pixel on-state, thereby supplying a drain region 7' a signal charge. The signal charge is stored in a depletion layer capacitance of p-n junction to give a pixel electrode 13 a potential through an Al electrode 9. At the time the potential of the pixel electrode 13 reaches the desired potential, the potential applied to the gate electrode 5 is cut off to make the switching transistor of the pixel off-state. Since the signal charge is stored in the p-n junction capacitance described above, the potential of the pixel electrode 13 is fixed until the switching transistor of the pixel is next driven. The liquid crystal 14 enclosed in the space between the substrate 1 and the opposite substrate 20 as illustrated in FIG. 2H is driven by the fixed potential of the pixel electrode 13.

In the active matrix substrate according to this embodiment, as apparent from FIG. 2H, the surfaces of the pixel electrodes 13 are smooth, and the insulating layer is filled in a space between adjacent pixel electrodes to each other. Therefore, the surface of the orientation film 15 formed thereon also becomes smooth and even. Accordingly, reduction in utilization efficiency of light due to scattering of incident light, lowering of contrast due to a failure in rubbing and occurrence of bright lines by a lateral electric field generated by difference in level between the pixel electrodes, which have heretofore been caused by the irregularities, are prevented, whereby the quality of images displayed is improved.

EXAMPLE 2

A liquid crystal display device having an active matrix substrate different from that in Example 1 will be described. The production processes of the active matrix substrate are described in line with FIGS. 3A to 3D.

Figure 3A:
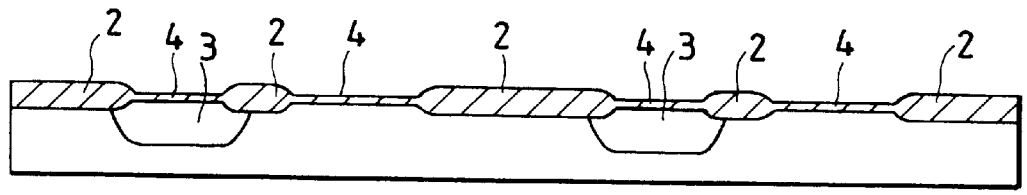
FIGS. 3A through 3D illustrate illustrative production processes of an active matrix substrate used in a display device according to another embodiment of the present invention.

First of all, LOCOS oxide films 2, PWLs 3 and gate oxide films 4 are formed on an n-type semiconductor substrate 1 in the same manner as in Example 1 (FIG. 3A).

Figure 3B:
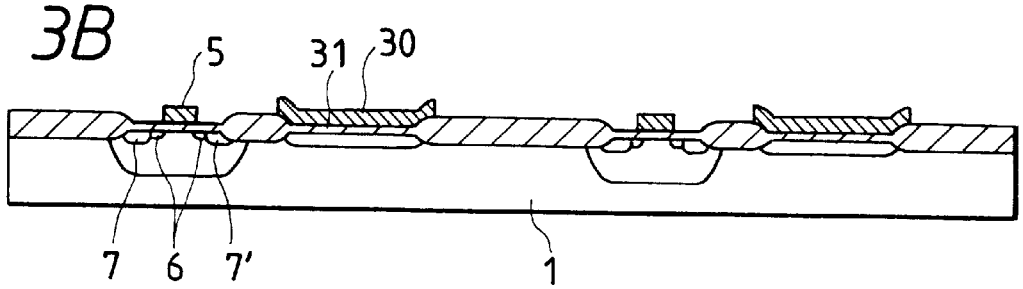

A patterned photoresist is used as a mask to implant phosphorus in a dose of about $10^{15}$ cm$^{-2}$ by ion implantation, thereby forming source and drain regions 7 and 7' having an impurity concentration of about $10^{19}$ cm$^{-3}$ and n-type impurity regions 31 which each form a pixel capacitance. Then, gate electrodes 5 composed of an n-type polysilicon and pixel capacitance electrodes 30, which each form the pixel capacitance, are formed (FIG. 3B).

Figure 3C:
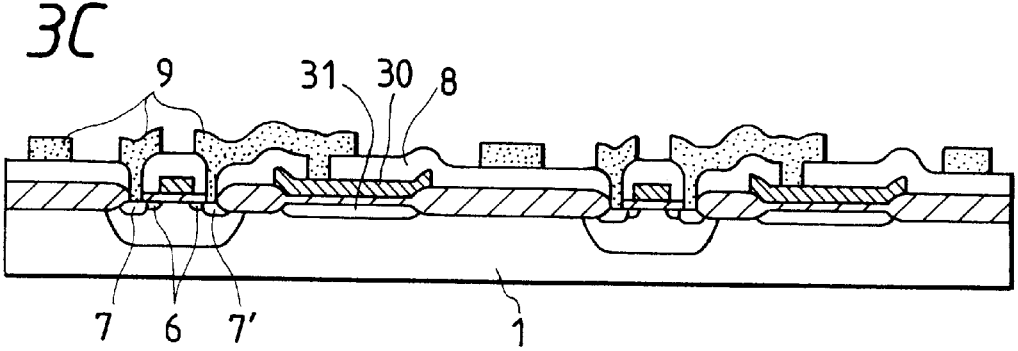

After a PSG layer 8 is formed on the substrate 1, contact holes are bored in the PSG layer 8 at portions, which are situated on the source and drain regions 7 and 7', and pixel capacitance electrodes 30, and Al film is formed on the PSG layer 8 by sputtering, the Al film is patterned to form Al electrodes 9. Each of the Al electrodes 9 connected to the drain 7' electrically connects the pixel capacitance electrode 30 to the drain 7' (FIG. 3C).

Figure 3D:
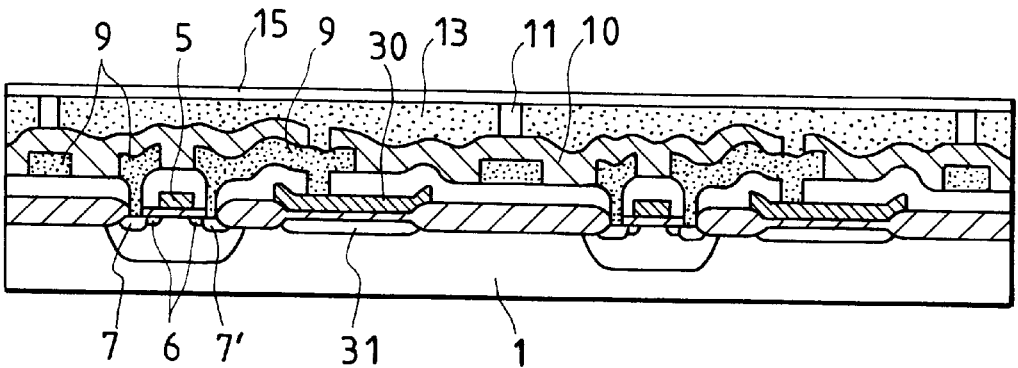

Thereafter, the same processes as in Example 1 are followed to form an active matrix substrate (FIG. 3D). Each of the pixel electrodes 13 is electrically connected to the drain 7'.

In this embodiment, each pixel capacitance is formed from the gate oxide film 4, the pixel capacitance electrode 30 and the n-type impurity region 31 having an impurity concentration of about $10^{19}$ cm$^{-3}$. Since the gate oxide film 4 insulates the pixel capacitance electrode 30 from the n-type impurity region 31, a capacitor small in leakage current is formed. As described above, the leakage current in the pixel capacitance becomes extremely small, so that the variation in potential of the pixel electrode 13 is prevented, whereby a reflection type liquid crystal display device high in contrast and image quality is realized. Besides, since the pixel capacitance electrode 30 reduces difference in level in the pixel, the smoothing by CMP is made easy.

EXAMPLE 3

Figure 4A:
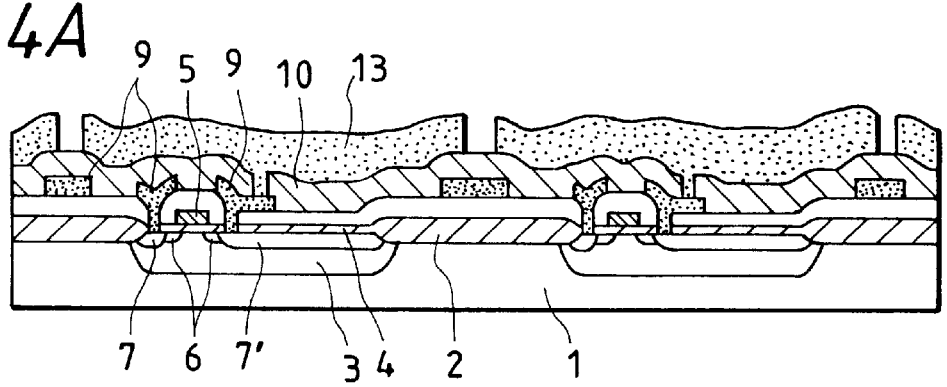
FIGS. 4A through 4C illustrate illustrative production processes of an active matrix substrate used in a display device according to a further embodiment of the present invention.

In this embodiment, the production processes of an active matrix substrate for a reflection type liquid crystal display device different from those in Examples 1 and 2 will be described in line with FIGS. 4A to 4C.

Gate electrodes 5, a PSG layer 8, Al electrodes 9 are formed on a substrate 1 in the same manner as in Example 1 (FIG. 3A), and a plasma SiN film 10 is formed thereon. Thereafter, pixel electrodes 13 are formed in a thickness of 10,000 Å or greater by sputtering (FIG. 4A).

Figure 4B:
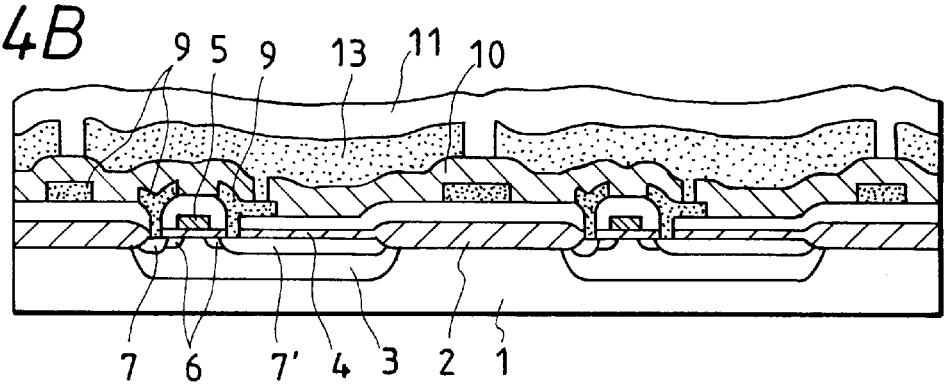
Figure 4C:
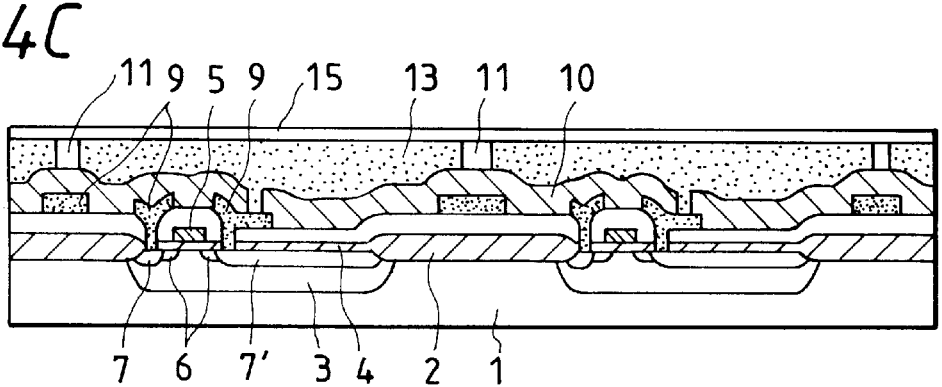

A PSG layer 11 is then formed in a thickness not smaller than the thickness of the pixel electrode 13 on the whole surface of the substrate 1 (FIG. 4B).

The surface of the substrate 1 is polished by CMP in the same manner as in Example 1, thereby smoothing the surface. Supposing the film thickness of the pixel electrode and the thickness of the PSG layer 11 are x Å and y Å, respectively, a depth of abrasion by CMP is not less than y Å but less than x+y Å. An orientation film 15 is further formed thereon (FIG. 4C).

In this embodiment, after the patterning and formation of the pixel electrodes 13, spaces between the electrodes are filled up with the PSG 11. Thereafter, the pixel electrodes 13 are exposed by CMP to smooth and specularly finish the surfaces thereof, and at the same time, they are electrically insulated and separated from each other. Since the abrading rates of the PSG 11 and the pixel electrode 13 by CMP are different from each other, the end point of CMP can be easily detected, whereby the CMP process is stabilized, and yield is enhanced.

EXAMPLE 4

Figure 5:
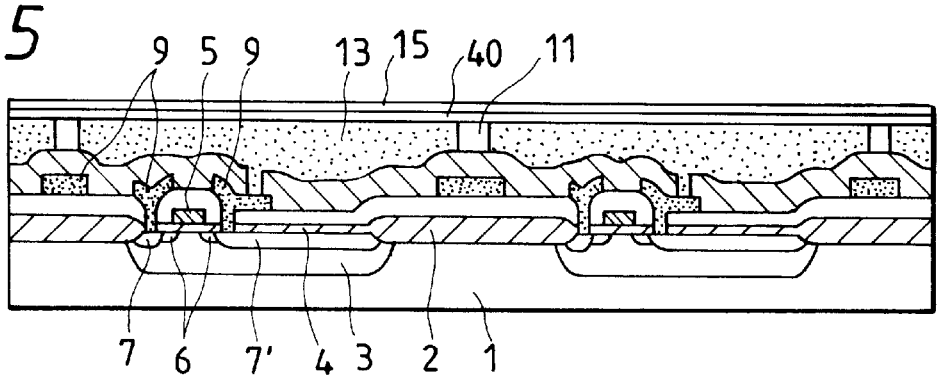
FIG. 5 illustrates an illustrative active matrix substrate used in a display device according to a still further embodiment of the present invention.

A cross section of an active matrix substrate according to this embodiment is illustrated in FIG. 5. According to this embodiment, a protective film 40 is provided on the active matrix substrate according to Example 1. The selection of the protective film 40 to match the orientation film 15 permits optimizing the orientation of the orientation film 15, so that the orientation characteristics of a liquid crystal are improved, and display with high image quality is realized. Besides, since the protective film 40 protects the pixel electrodes 13, it can also prevent the pixel electrodes 13 from being scratched. It goes without saying that the protective film 40 according to this embodiment can be applied to Examples 1, 2 and 3.

EXAMPLE 5

In this embodiment, the production processes of an active matrix substrate used in a transmission type liquid crystal display device will be described in line with FIGS. 6A to 6E, and FIGS. 7F and 7G.

Figure 6A:
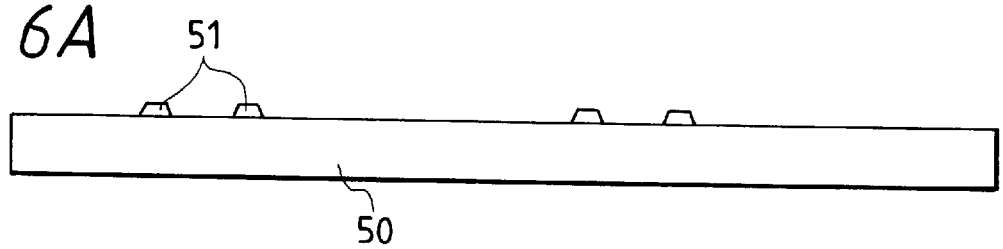
FIGS. 6A through 6E illustrate illustrative production processes of an active matrix substrate used in a display device according to a yet still further embodiment of the present invention.

Island-like semiconductor regions 51 having a height of about 2,000 Å are formed with polysilicon or amorphous silicon on a transparent substrate 50 such as a quartz substrate (FIG. 6A).

Figure 6B:
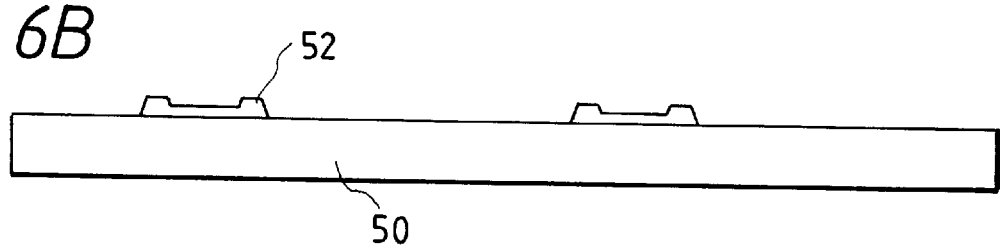

After a film of polysilicon or amorphous silicon is formed in a thickness of 1,000 Å or smaller on the surface of the transparent substrate 50, and BF$_2$ is ion-implanted in a dose of about $10^{12}$ cm$^{-2}$, the film is patterned to form TFTs (thin film transistors) 52 (FIG. 6B).

Figure 6C:
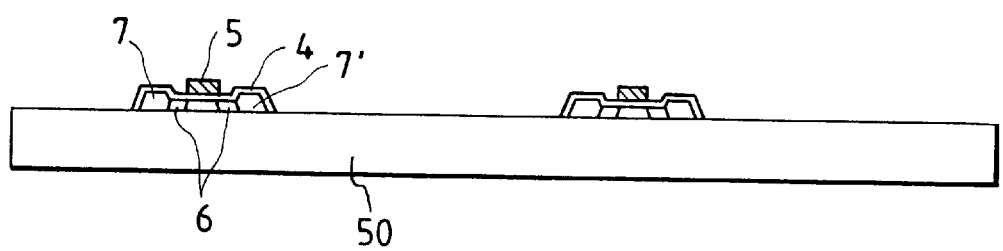

Gate oxide films 4 are formed in a thickness of 300 Å or greater by thermal oxidation to form gate electrodes 5 composed of polysilicon. NLD regions 6, and source and drain regions 7 and 7' are formed by ion implantation (FIG. 6C).

Figure 6D:
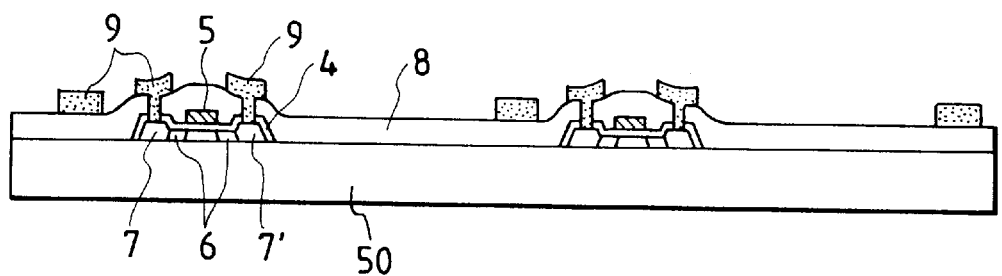

After a PSG layer 8, which is an interlayer film, is formed, contact holes are cut therein, and an Al film is formed on the PSG layer 8 and patterned to form Al electrodes 9 (FIG. 6D).

Figure 6E:
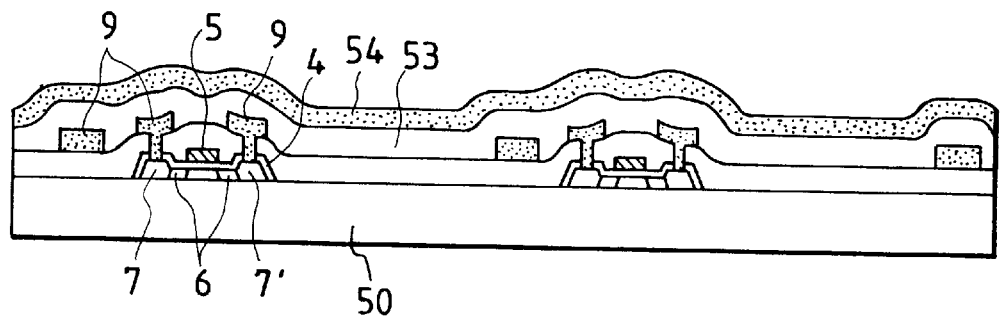

A PSG layer 53, which is an interlayer film, and a light-shielding layer 54 for TFT are formed in that order (FIG. 6E). As the light-shielding layer 54, a film of Ti, Ta, W or the like, which undergoes no occurrence of spike in a subsequent heating process and has good light-shielding properties, is formed in a thickness of about 2,000 Å. The light-shielding layer 54 is electrically connected even after its patterning in FIG. 7F and fixed at a certain potential by being connected to a peripheral circuit, thereby forming a pixel capacitance with a pixel electrode 13.

Figure 7F:
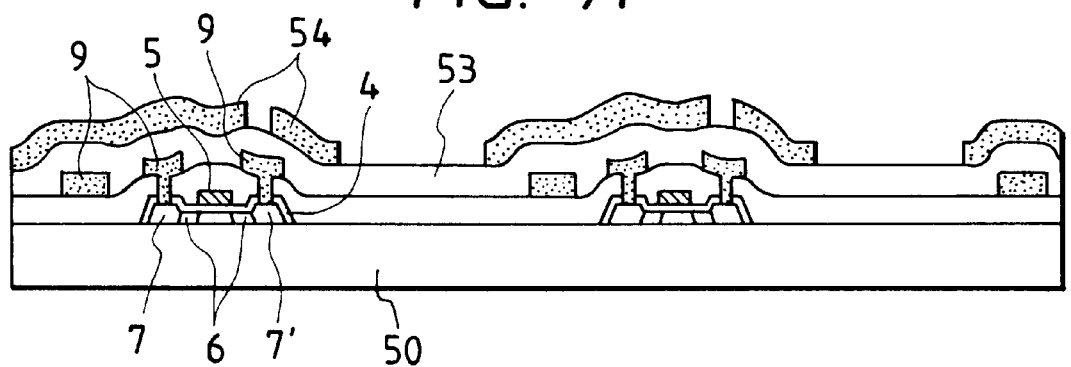
FIGS. 7F and 7G illustrate illustrative production processes of the active matrix substrate used in the display device according to the yet still further embodiment of the present invention.
Figure 7G:
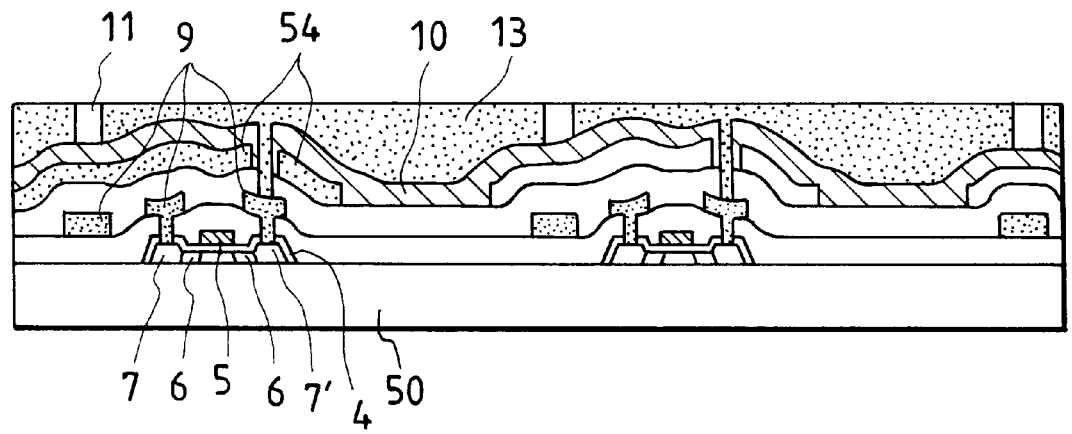

Thereafter, the same processes as in Example 1 are followed to form a plasma SiN film 10 and a PSG layer 11, pattern the PSG layer 11, bore through-holes according to the pattern, and form a film for pixel electrodes 13. A material for the pixel electrodes 13 is selected from transparent materials such as ITO, thereby constructing a transmission type liquid crystal display device. Alternatively, when a metallic material such as Al, Ti or Ta or a compound of such a metal is used, a reflection type liquid crystal display device is constructed. Surface polishing is subsequently performed by CMP in the same manner as in Example 1 to smooth the pixel electrodes; 13 and at the same time, expose the PSG layer 11, whereby the individual pixel electrodes 13 are electrically insulated and separated from each other (FIG. 7G).

To this embodiment, the smoothing process by CMP in Example 3 and the protective film 40 in Example 4 may be applied.

EXAMPLE 6

The production processes of an active matrix substrate applied to a liquid crystal display device according to this embodiment are illustrated in FIGS. 8A to 8D, FIGS. 9E to 9H and FIGS. 10I to 10K.

Figure 8A:
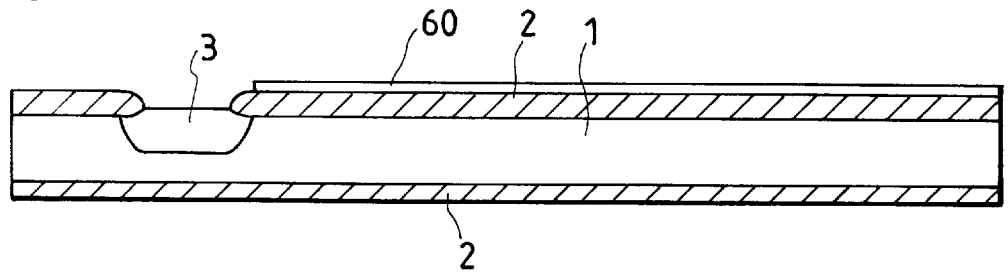
FIGS. 8A through 8D illustrate illustrative production processes of an active matrix substrate used in a display device according to a yet still further embodiment of the present invention.

LOCOS oxide films 2 are formed on both sides of an n-type semiconductor substrate 1, an Lp (low pressure)-SiN film 60 is formed in a thickness of 4,000 Å or smaller on the portion of the LOCOS oxide film 2 corresponding to a pixel part, and a PWL 3 is formed (FIG. 8A).

Figure 8B:
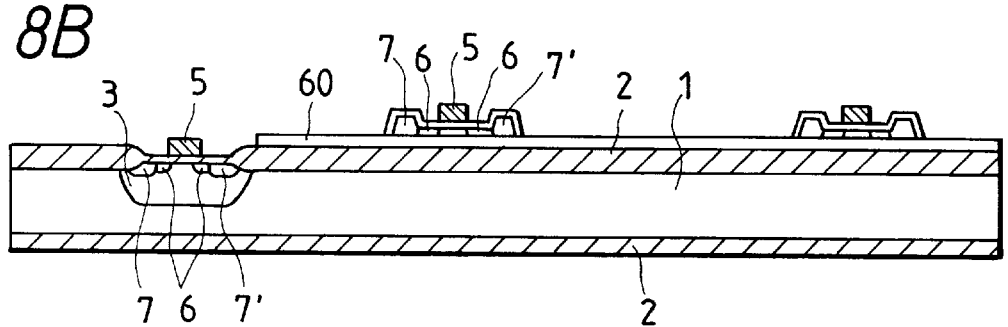

A peripheral circuit is formed in and on the semiconductor substrate by the same process as in Example 1, and switching transistors of the pixel part are formed on the Lp-SiN, film 60 by the same process as the forming process of TFT in Example 5 (FIG. 8B).

Figure 8C:
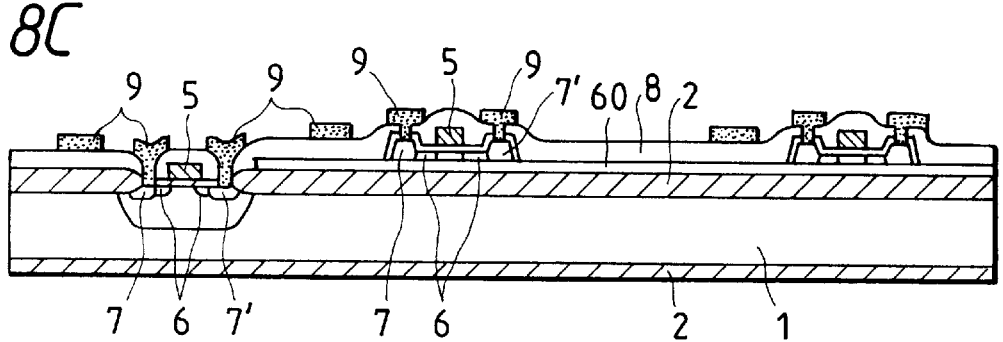

A PSG layer 8 is formed to form Al electrodes 9 (FIG. 8C).

Figure 8D:
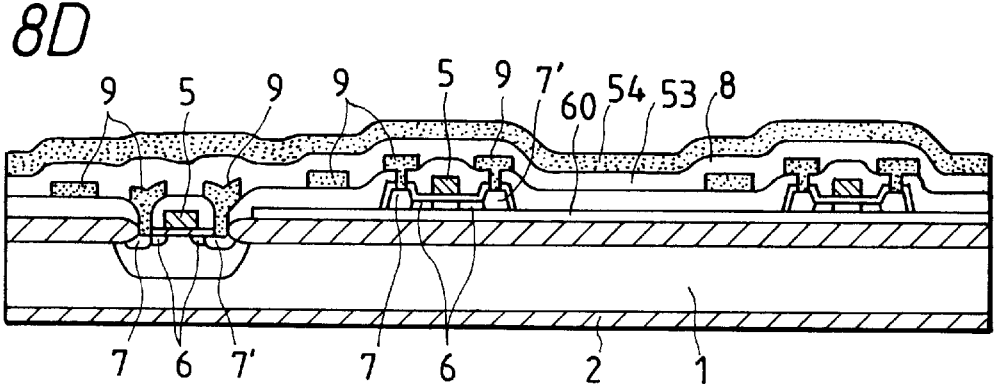

A PSG layer 53 and a light-shielding layer 54 are then formed (FIG. 8D).

Figure 9E:
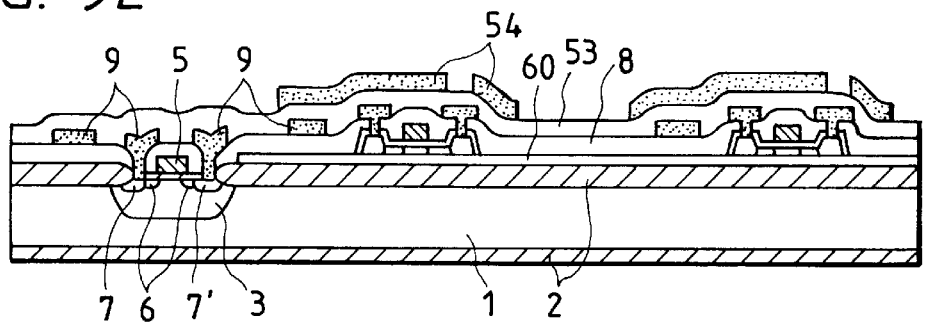
FIGS. 9E through 9H illustrate illustrative production processes of the active matrix substrate used in the display device according to the yet still further embodiment of the present invention.
Figure 9F:
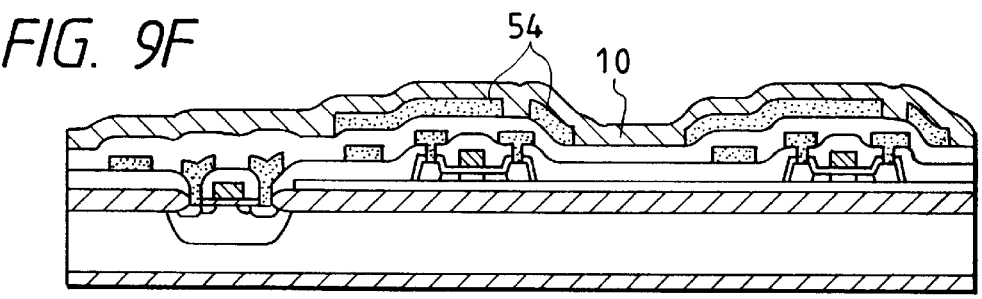

The light-shielding layer 54 is patterned so as to leave it only right over each TFT in the pixel part (FIG. 9E).

Figure 9G:
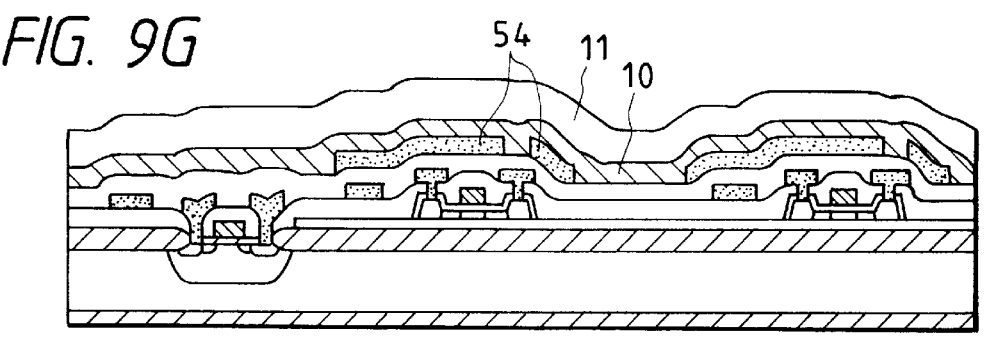

A plasma SiN film 10 is formed in a thickness of about 3,000 Å (FIG. 9F), and a PSG layer 11 is formed in a thickness of 10,000 Å or greater in such a manner that the height of the PSG layer 11 on the peripheral circuit becomes higher than the light-shielding layer 54 (FIG. 9G).

Figure 9H:
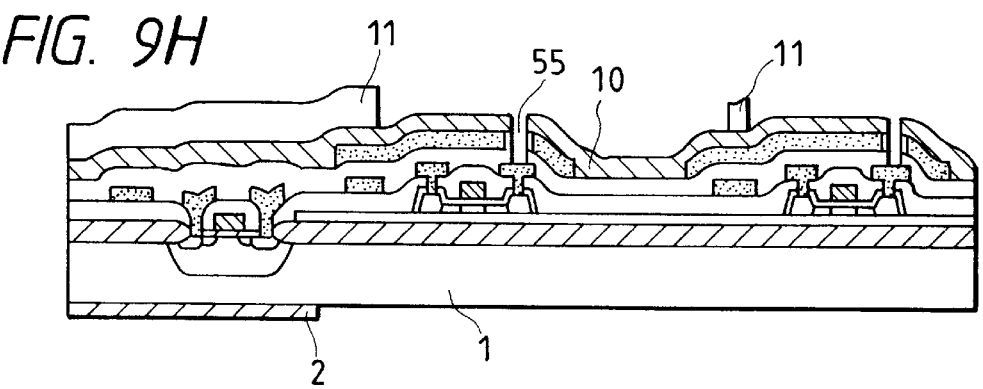
Figure 10I:
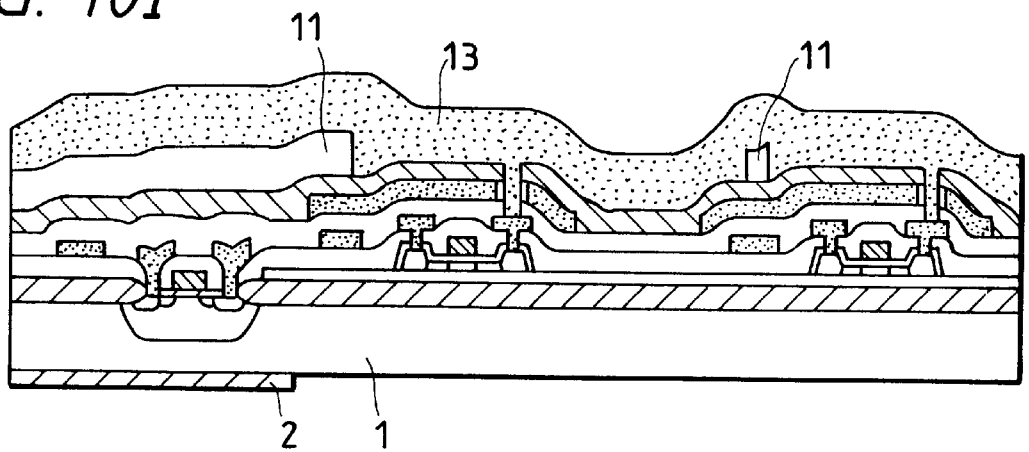
FIGS. 10I through 10K illustrate illustrative production processes of the active matrix substrate used in the display device according to the yet still further embodiment of the present invention.

The PSG layer 11 is patterned, and the LOCOS oxide layer 2 on the back side of the substrate 1 is patterned to remove the LOCOS oxide film 2 right under the pixel part (FIG. 9H). A film for pixel electrodes 13 is formed in a thickness greater than the thickness of the PSG layer 11 (FIG. 10I). When a material for the pixel electrodes 13 is selected in the same manner as in Example 5, the liquid crystal display device according to this embodiment may be constructed either as a reflection type or as a transmission type.

Figure 10J:
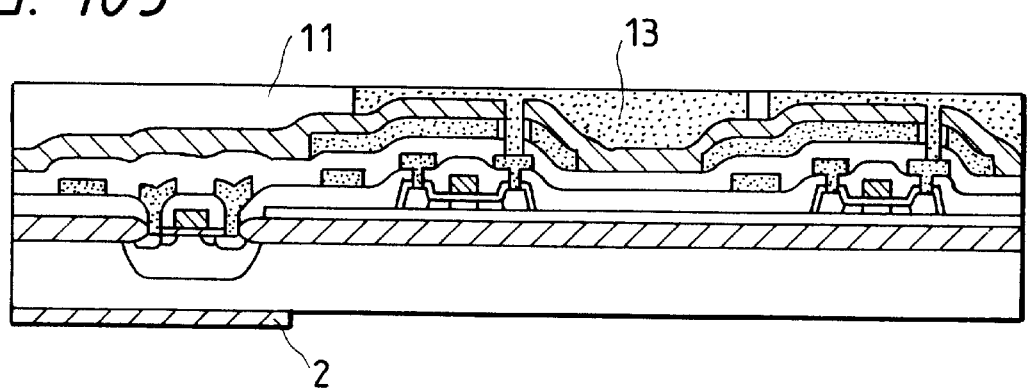

Surface polishing is performed by CMP in the same manner as in Example 1 to smooth the pixel electrodes 13 and at the same time, the individual pixel electrodes 13 are electrically insulated and separated from each other (FIG. 10J). Supposing the film thickness of the pixel electrode and the thickness of the PSG layer 11 are x Å and y Å, respectively, a depth of abrasion by CMP is not less than x Å but less than x+y Å.

Figure 10K:
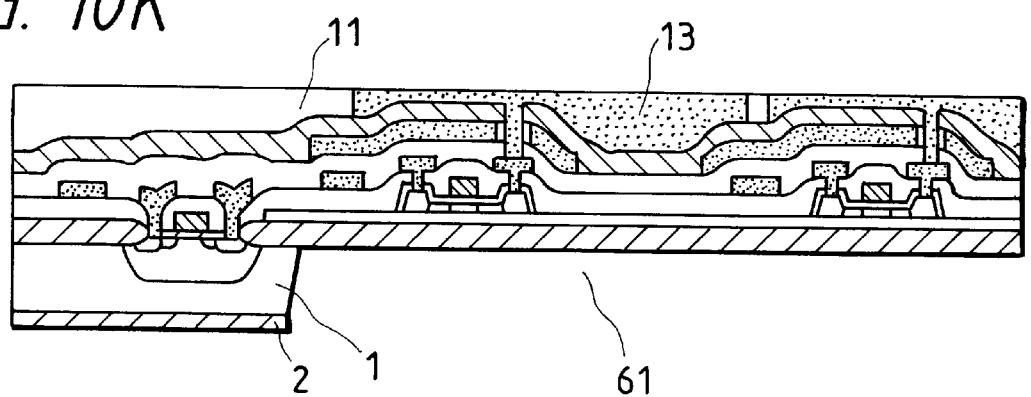
Figure 11A:
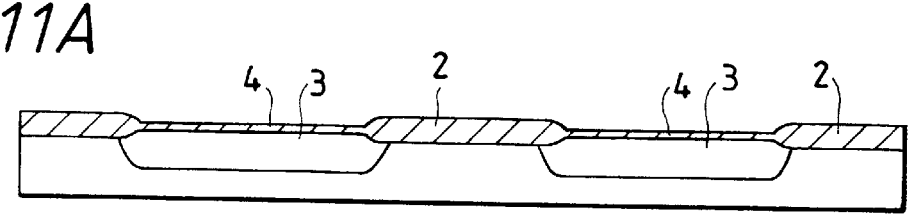
FIGS. 11A through 11E illustrate illustrative production processes of an active matrix substrate used in a conventional display device.
Figure 11B:
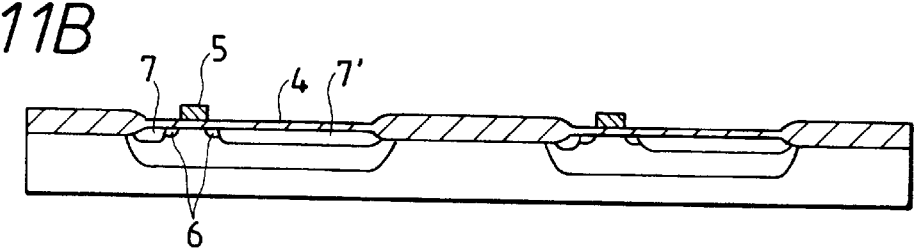
Figure 11C:
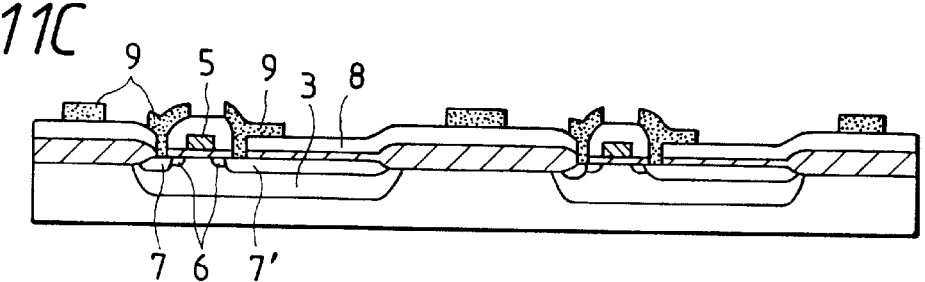
Figure 11D:
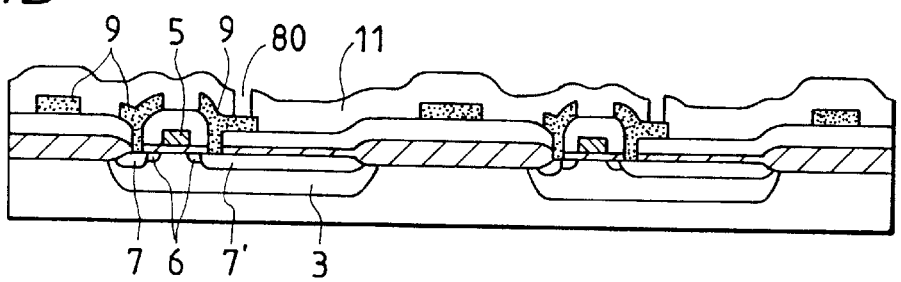
Figure 11E:
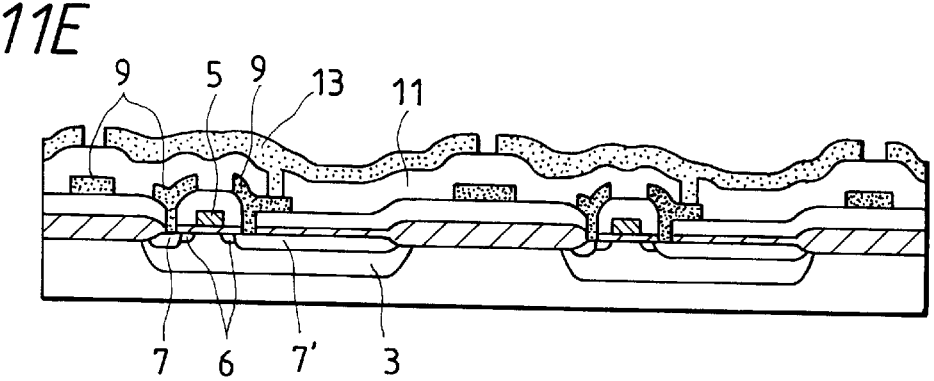
Figure 12:
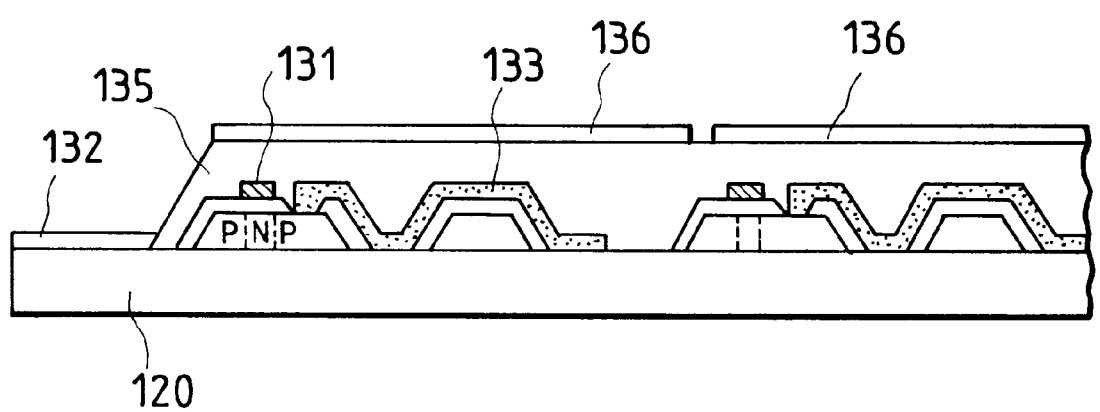
FIG. 12 illustrates an illustrative active matrix substrate used in another conventional display device.

When this embodiment is applied to the transmission type, a liquid crystal is packaged, a cell is fabricated, and the substrate 1 is then etched at a portion under the pixel part with an alkaline etching solution for Si such as a solution of TMAH (tetramethylammonium hydroxide) or KOH to form an undercut part 61 (FIG. 10K). When the display device is constructed as the reflection type, this process is unnecessary.

In this embodiment, the peripheral circuit is formed with monocrystalline Si, so that high-speed drive is feasible. On the other hand, the switching transistors of the pixel part are constructed as the transmission type on the membrane. Therefore, a high-definition and high-image quality transmission type liquid crystal display device as demonstrated by at least 300,000 pixels per 0.6 inch in diagonal is really provided. As described above, the material for the pixel electrodes may be suitably selected, whereby a reflection type liquid crystal display device may be constructed to reduce its cost.

According to the present invention, as described above, there can be constructed a display device in which the surfaces of pixel electrodes are even, and any difference in level between the pixel electrodes is smoothed. In the case of a reflection type display device, it is high in the reflection efficiency of light and contrast and can hence display images of high quality. In the case where the display device is constructed as a liquid crystal display device, the orientation characteristics of an orientation film is improved, and besides, no lateral electric field is generated between the individual pixel electrodes, so that the occurrence of bright lines which will lower the image quality is prevented, thereby preventing the deterioration of the image quality.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display device comprising a substrate and a plurality of conductive members provided on the substrate, each of said conductive members having a substantially even surface which acts as a pixel electrode connected to a switching element comprising a silicon layer, wherein insulating members each having a substantially even surface and comprising silicon atoms are provided at ends of their corresponding conductive members in such a manner that the substantially even surface of the insulating member ranges with the substantially even surface of the conductive member.

2. The display device according to claim 1, wherein the conductive members comprise electrodes.

3. A display device comprising an active matrix substrate, in which a switching transistor containing a silicon layer is provided for each pixel electrode, an electrode substrate opposite to the active matrix substrate and a liquid crystal held between these substrates, wherein the surfaces of pixel electrodes are on the same level with each other, and at least a part of a side wall of each of the pixel electrodes comes into contact with an insulator containing silicon atoms.

4. The display device according to claim 3, wherein the switching transistor-arranged on the active matrix substrate is comprised of a monocrystalline semiconductor.

5. The display device according to claim 3, wherein the switching transistor is comprised of a polycrystal line semiconductor.

6. The display device according to any one of claims 3 to 5, wherein the active matrix substrate is constructed by using a monocrystalline semiconductor substrate.

7. The display device according to any one of claims 3 to 5, wherein the active matrix substrate is constructed by using a transparent substrate.

8. A method of producing a display device having a substrate and a plurality of conductive members provided on the substrate, said conductive members each having a substantially even surface which acts as a pixel electrode, comprising the steps of:

providing an insulating layer on the substrate;

patterning the insulating layer to leave a separation region between said pixel electrodes to be formed;

forming a conductive material on said patterned insulating layer; and smoothing the surface of said conductive material by means of chemical mechanical polishing to obtain said conductive members.

9. The method according to claim 8, wherein the conductive members comprise electrodes.

10. A method of producing a display device comprising an active matrix substrate, in which a switching transistor is provided for each pixel electrode, a common electrode substrate opposite to the active matrix substrate and a liquid crystal held between these substrates, wherein the active matrix substrate is produced by the following steps:

preparing a substrate;

forming a plurality of transistors on the substrate;

forming an insulating layer on said transistors;

patterning the insulating layer to leave a separation region between said pixel electrodes to be formed;

forming a conductive material on said patterned insulating layer; and smoothing the surface of said conductive material by means of chemical mechanical polishing to obtain said pixel electrodes.

11. The method according to claim 10, wherein after a first insulating layer under pixel electrodes is patterned, a film is formed with a material for the pixel electrodes on the whole surface of the active matrix substrate, and the film for the pixel electrodes are polished by chemical mechanical polishing to form the surfaces of the pixel electrodes.

12. The method according to claim 10, wherein after a first insulating layer under pixel electrodes is patterned, a film is formed with a material for the pixel electrodes on the whole surface of the active matrix substrate and then patterned, and then a second insulating layer is further formed, and the second insulating layer is polished by chemical mechanical polishing to remove the second insulating layer at portions on the pixel electrodes, and at the same time, to polish the surfaces of the pixel electrodes.

13. An active matrix substrate comprising:

a substrate;

a plurality of switching elements provided on said substrate;

a plurality of conductive members comprised in a plurality of pixels, with each of said switching elements containing a silicon layer, and each of said conductive members provided on said substrate and having a substantially even surface and being connected to said switching element; and insulating members each comprising silicon atoms provided at ends of their corresponding conductive members in such a manner that said insulating member ranges with the substantially even surface of said conductive member.

14. An active matrix substrate according to claim 13, wherein a surface of said insulating member ranging with said end of said conductive member is substantially even.

15. An active matrix substrate according to claim 14, wherein said even surfaces of said conductive and insulating members are smoothed by chemical mechanical polishing.

16. An active matrix substrate according to claim 15, wherein the even surface of said conductive member comprises a specular surface.

17. An active matrix substrate according to claim 13, wherein an insulating layer is located between said insulating member and said switching element.

18. An active matrix substrate according to claim 13, wherein said insulating member is comprised of phosphosilicate glass.

19. An active matrix substrate according to claim 17, wherein said insulating layer functions as an etching stopper when said insulating member is formed by patterning.

20. An active matrix substrate according to claim 19, wherein said insulating layer is comprised of silicon nitride.

21. An active matrix substrate according to claim 13, wherein said conductive member is comprised of a metal or compound of metal.

22. An active matrix substrate according to claim 21, wherein said conductive member is comprised of a material selected from a group consisting of Al, Ti, Ta, W, and Indium Thin Oxide.

23. An active matrix substrate according to claim 21, wherein said conductive member is formed so as to attain a thickness of 10,000 Å or more.

24. An active matrix substrate according to claim 13, wherein said substrate is comprised of a semiconductor substrate.

25. An active matrix substrate according to claim 24, wherein said semiconductor substrate is a single-crystal silicon substrate.

26. An active matrix substrate according to claim 13, wherein said substrate is comprised of a transparent substrate.

27. An active matrix substrate according to claim 26, wherein said transparent substrate is comprised of a quartz substrate.

28. An active matrix substrate according to claim 13, wherein said switching element is comprised of a transistor.

29. An active matrix substrate according to claim 28, wherein said transistor is formed by using a single-crystal silicon.

30. An active matrix substrate according to claim 28, wherein said transistor is formed by using a polycrystal silicon.

31. An active matrix substrate according to claim 25, wherein pixel capacitance is formed between an impurity region formed in said single-crystal silicon substrate and a pixel capacitance electrode formed so as to make an oxide film exist between the pixel capacitance electrode and said impurity region.

32. An active matrix substrate according to claim 26, wherein a light-shielding layer is located on said switching element so as to make an insulating layer exist between said light-shielding layer and said switching element.

33. An active matrix substrate according to claim 32, wherein said light-shielding layer is comprised of a material selected from a group consisting of Ti, Ta and W.

34. An active matrix substrate according to claim 32, wherein a pixel capacitance is formed between said light-shielding layer and said conductive member.

35. A method of producing an active matrix substrate comprising a substrate, a plurality of switching elements provided on said substrate, and a plurality of conductive members comprised in a plurality of pixels, with each of the conductive members being provided on the substrate and having a substantially even surface and being connected to the switching element, said method comprising the steps of:

preparing a substrate;

forming the switching elements on the substrate;

forming an insulating layer on the switching elements;

patterning the insulating layer to leave a separation region for the pixels between the pixels to be formed;

forming a conductive material on the patterned insulating layer; and smoothing the surface of the conductive material by means of chemical mechanical polishing to obtain the conductive members.

36. A method of producing an active matrix substrate according to claim 35, wherein the surface of the conductive material and a surface of the separation region comprised of the insulating layer are smoothed by chemical mechanical polishing.

37. A method of producing an active matrix substrate according to claim 35, wherein the even surface of the conductive member is treated so as to comprise a specular surface.

38. A method of producing an active matrix substrate according to claim 35, wherein an insulating layer comprising silicon atoms is used as the insulating layer.

39. A method of producing an active matrix substrate according to claim 38, wherein the insulating layer is formed by a layer-forming method.

40. A method of producing an active matrix substrate according to claim 39, wherein phospho-silicate glass is used as the insulating layer.

41. A method of producing an active matrix substrate according to claim 35, wherein prior to the formation of the insulating layer, a first insulating layer different from the insulating layer is formed on the switching element.

42. A method of producing an active matrix substrate according to claim 41, wherein the first insulating layer is used as an etching stopper in the step of patterning the insulating layer.

43. A method of producing an active matrix substrate according to claim 42, wherein silicon nitride is used as the first insulating layer.

44. A method of producing an active matrix substrate according to claim 43, wherein the silicon nitride is formed into a layer by using plasma.

45. A method of producing an active matrix substrate according to claim 42, wherein the patterning is comprised of a step of dry etching.

46. A method of producing an active matrix substrate according to claim 35, wherein the chemical mechanical polishing uses an abrasive capable of polishing and containing a chemical ingredient capable of etching.

47. A method of producing an active matrix substrate according to claim 35, wherein the conductive material is formed by a layer-forming method.

48. A method of producing an active matrix substrate according to claim 47, wherein a sputtering method or vapor deposition method is used as the layer forming method.

49. A method of producing an active matrix substrate according to claim 35, wherein a metal or a compound of metal is used as the conductive material.

50. A method of producing an active matrix substrate according to claim 49, wherein the conductive material is comprised of a material selected from a group consisting of Al, Ti, Ta, W, and Indium Thin Oxide.

51. A method of producing an active matrix substrate according to claim 47, wherein the conductive material is formed into a layer so as to attain a thickness of 10,000 Å or more.

52. A method of producing an active matrix substrate according to claim 35, wherein a semiconductor substrate is used as the substrate.

53. A method of producing an active matrix substrate according to claim 52, wherein the semiconductor substrate is a single-crystal silicon substrate.

54. A method of producing an active matrix substrate according to claim 35, wherein a transparent substrate is used as the substrate.

55. A method of producing an active matrix substrate according to claim 54, wherein the transparent substrate is comprised of a quartz substrate.

56. A method of producing an active matrix substrate according to claim 35, wherein the switching element is comprised of a transistor.

57. A method of producing an active matrix substrate according to claim 56, wherein the transistor is formed by using a single-crystal silicon.

58. A method of producing an active matrix substrate according to claim 56, wherein the transistor is formed by using a polycrystal silicon.

59. A method of producing an active matrix substrate according to claim 53, wherein an impurity region is formed in the single-crystal silicon substrate, and a pixel capacitance is formed between the impurity region and a pixel capacitance electrode formed so as to make an oxide film exist between the pixel capacitance electrode and the impurity region.

60. A method of producing an active matrix substrate according to claim 54, wherein a light-shielding layer is formed on the switching element so as to make an insulating layer exist between the light-shielding layer and the switching element.

61. A method of producing an active matrix substrate according to claim 60, wherein the light-shielding layer is comprised of a material selected from a group consisting of Ti, Ta and W.

62. A method of producing an active matrix substrate according to claim 60, wherein a pixel capacitance is formed between the light-shielding layer and the conductive member.

63. A display device comprising:

an active matrix substrate comprising a substrate;

a plurality of switching elements provided on said substrate;

a plurality of conductive members comprised in a plurality of pixels, with each of said switching elements containing a silicon layer, and each of said conductive members being provided on said substrate and having a substantially even surface and being connected to said switching element;

an opposite substrate comprising an electrode opposite to said pixels;

a liquid crystal material held between said active matrix substrate and said opposite substrate; and insulating members each comprising silicon atoms provided at ends of their corresponding conductive members in such a manner that said insulating member ranges with the substantially even surface of said conductive member.

64. A display device according to claim 63, wherein a surface of said insulating member ranging with said end of said conductive member is substantially even.

65. A display device according to claim 64, wherein said even surfaces of said conductive and insulating members are smoothed by chemical mechanical polishing.

66. A display device according to claim 65, wherein the even surface of said conductive member comprises a specular surface.

67. A display device according to claim 63, wherein an insulating layer is located between said insulating member and said switching element.

68. A display device according to claim 63, wherein said insulating member is comprised of phospho-silicate glass.

69. A display device according to claim 67, wherein said insulating layer functions as an etching stopper when said insulating member is formed by patterning.

70. A display device according to claim 69, wherein said insulating layer is comprised of silicon nitride.

71. A display device according to claim 63, wherein said conductive member is comprised of a metal or compound of metal.

72. A display device according to claim 71, wherein said conductive member is comprised of a material selected from a group consisting of Al, Ti, Ta, W, and Indium Thin Oxide.

73. A display device according to claim 71, wherein said conductive member is formed so as to attain a thickness of 10,000 Å or more.

74. A display device according to claim 63, wherein said substrate is comprised of a semiconductor substrate.

75. A display device according to claim 74, wherein said semiconductor substrate is a single-crystal silicon substrate.

76. A display device according to claim 63, wherein said substrate is comprised of a transparent substrate.

77. A display device according to claim 76, wherein said transparent substrate is comprised of a quartz substrate.

78. A display device according to claim 63, wherein said switching element is comprised of a transistor.

79. A display device according to claim 78, wherein said transistor is formed by using a single-crystal silicon.

80. A display device according to claim 78, wherein said transistor is formed by using a polycrystal silicon.

81. A display device according to claim 75, wherein pixel capacitance is formed between an impurity region formed in said single-crystal silicon substrate and a pixel capacitance electrode formed so as to make an oxide film exist between the pixel capacitance electrode and said impurity region.

82. A display device according to claim 76, wherein a light-shielding layer is located on said switching element so as to make an insulating layer exist between the light-shielding layer and said switching element.

83. A display device according to claim 82, wherein said light-shielding layer is comprised of a material selected from a group consisting of Ti, Ta and W.

84. A display device according to claim 82, wherein a pixel capacitance is formed between said light-shielding layer and said conductive member.

85. A display device according to claim 63, wherein an orientation film is located on said active matrix substrate.

86. A display device according to claim 63, wherein a color filter is located on said opposite substrate.

87. A display device according to claim 63, wherein a black matrix is located on said opposite substrate.

88. A display device according to claim 63, wherein a spacer is located between said active matrix substrate and said opposite substrate.

89. A display device according to claim 63, which functions as a reflection type liquid crystal display device.

90. A display device according to claim 63, which functions as a transmission type liquid crystal display device.

91. A display device according to claim 75, wherein a side of said single-crystal silicon substrate opposite to the other side on which said conductive member has been located is partially removed by means of etching so that said substrate is partially transparentized.

92. A display device according to claim 91, which functions as a transmission type liquid crystal display device.

93. A method of producing a display device comprising an active matrix substrate comprising a substrate, a plurality of switching elements provided on said substrate, and a plurality of conductive members comprised in a plurality of pixels, with each of the conductive members being provided on the substrate and having a substantially even surface and being connected to the switching element, an opposite substrate comprising an electrode opposite to the pixels, and a liquid crystal material held between the active matrix substrate and the opposite substrate, said method comprising the steps of:

preparing a substrate;

forming the switching elements on the substrate;

forming an insulating layer on the switching elements;

patterning the insulating layer to leave a separation region for the pixels between the pixels to be formed;

forming a conductive material on the patterned insulating layer; and smoothing the surface of the conductive material by chemical mechanical polishing to obtain the conductive members.

94. A method of producing a display device according to claim 93, wherein the surface of the conductive material and a surface of the separation region comprised of the insulating layer are smoothed by chemical mechanical polishing.

95. A method of producing a display device according to claim 93, wherein the even surface of the conductive member is treated so as to comprise a specular surface.

96. A method of producing a display device according to claim 93, wherein an insulating layer comprising silicon atoms is used as the insulating layer.

97. A method of producing a display device according to claim 96, wherein the insulating layer is formed by a layer-forming method.

98. A method of producing a display device according to claim 97, wherein phospho-silicate glass is used as the insulating layer.

99. A method of producing a display device according to claim 93, wherein prior to the formation of the insulating layer, a first insulating layer different from the insulating layer is formed on the switching element.

100. A method of producing a display device according to claim 99, wherein the first insulating layer is used as an etching stopper in the step of patterning the insulating layer.

101. A method of producing a display device according to claim 100, wherein silicon nitride is used as the first insulating layer.

102. A method of producing a display device according to claim 101, wherein the silicon nitride is formed into a layer by using plasma.

103. A method of producing a display device according to claim 100, wherein the patterning is comprised of a step of dry etching.

104. A method of producing a display device according to claim 93, wherein the chemical mechanical polishing is conducted using an abrasive capable of polishing and containing a chemical ingredient capable of etching.

105. A method of producing a display device according to claim 93, wherein the conductive material is formed by a layer-forming method.

106. A method of producing a display device according to claim 105, wherein a sputtering method or a vapor deposition method is used as the layer-forming method.

107. A method of producing a display device according to claim 93, wherein a metal or a compound of metal is used as the conductive material.

108. A method of producing a display device according to claim 107, wherein the conductive material is comprised of a material selected from a group consisting of Al, Ti, Ta, W, and Indium Thin Oxide.

109. A method of producing a display device according to claim 105, wherein the conductive material is formed into a layer so as to attain a thickness of 10,000 Å or more.

110. A method of producing a display device according to claim 93, wherein a semiconductor substrate is used as the substrate.

111. A method of producing a display device according to claim 110, wherein the semiconductor substrate is a single-crystal silicon substrate.

112. A method of producing a display device according to claim 93, wherein a transparent substrate is used as the substrate.

113. A method of producing a display device according to claim 112, wherein the transparent substrate is comprised of a quartz substrate.

114. A method of producing a display device according to claim 93, wherein the switching element is comprised of a transistor.

115. A method of producing a display device according to claim 114, wherein the transistor is formed by using a single crystal silicon.

116. A method of producing a display device according to claim 114, wherein the transistor is formed by using a polycrystal silicon.

117. A method of producing a display device according to claim 111, wherein an impurity region is formed in the single-crystal silicon substrate, and a pixel capacitance is formed between the impurity region and a pixel capacitance electrode formed so as to make an oxide film exist between the pixel capacitance electrode and the impurity region.

118. A method of producing a display device according to claim 112, wherein a light-shielding layer is formed on the switching element so as to make an insulating layer exist between the light-shielding layer and the switching element.

119. A method of producing a display device according to claim 118, wherein the light-shielding layer is comprised of a material selected from a group consisting of Ti, Ta and W.

120. A method of producing a display device according to claim 118, wherein a pixel capacitance is formed between the light-shielding layer and the conductive member.

121. A method of producing a display device according to claim 93, wherein an orientation film is located on the active matrix substrate.

122. A method of producing a display device according to claim 93, wherein a color filter is located on the opposite substrate.

123. A method of producing a display device according to claim 93, wherein a black matrix is located on the opposite substrate.

124. A method of producing a display device according to claim 93, wherein a spacer is located between the active matrix substrate and the opposite substrate.

125. A method of producing a display device according to claim 111, wherein after the liquid crystal material is located between the active matrix substrate and the opposite substrate, a side of the single-crystal silicon substrate opposite to the other side on which the conductive member has been located is partially removed by etching.

* * * * *

UNITED STATES PATENT AND TRADEMARK OFFICE
CERTIFICATE OF CORRECTION

PATENT NO. : 5,933,204

DATED : August 3, 1999

INVENTOR(S): YOSHIHIKO FUKUMOTO

It is certified that error appears in the above-identified patent and that said Letters Patent is hereby corrected as shown below:

COLUMN 2:

Line 18, "substrates" should read --substrate--.

COLUMN 5:

Line 7, Teijirn" should read --Teijin--.
Line 46, "$10^{16-}$" should read --$10^{16}$--.
Line 55, "$10^{16-}$" should read --$10^{16}$--.

COLUMN 10:

Line 63, "transistor-arranged" should read
   --transistor arranged--.
Line 66, "polycrystal line" should read --polycrystalline--.

COLUMN 12:

Line 28, "Thin should read --Tin--.

COLUMN 14:

Line 2, Thin" should read --Tin--.

UNITED STATES PATENT AND TRADEMARK OFFICE
CERTIFICATE OF CORRECTION

PATENT NO. : 5,933,204

DATED : August 3, 1999

INVENTOR(S): FUKUMOTO                                    Page 2 of 2

It is certified that error appears in the above-identified patent and that said Letters Patent is hereby corrected as shown below:

COLUMN 15:

Line 24, "Thin" should read --Tin--.

COLUMN 17:

Line 13, "Thin" should read --Tin--.

Signed and Sealed this

Twenty-third Day of May, 2000

Attest:

Q. TODD DICKINSON

Attesting Officer          Director of Patents and Trademarks